Patented Nov. 8, 1932

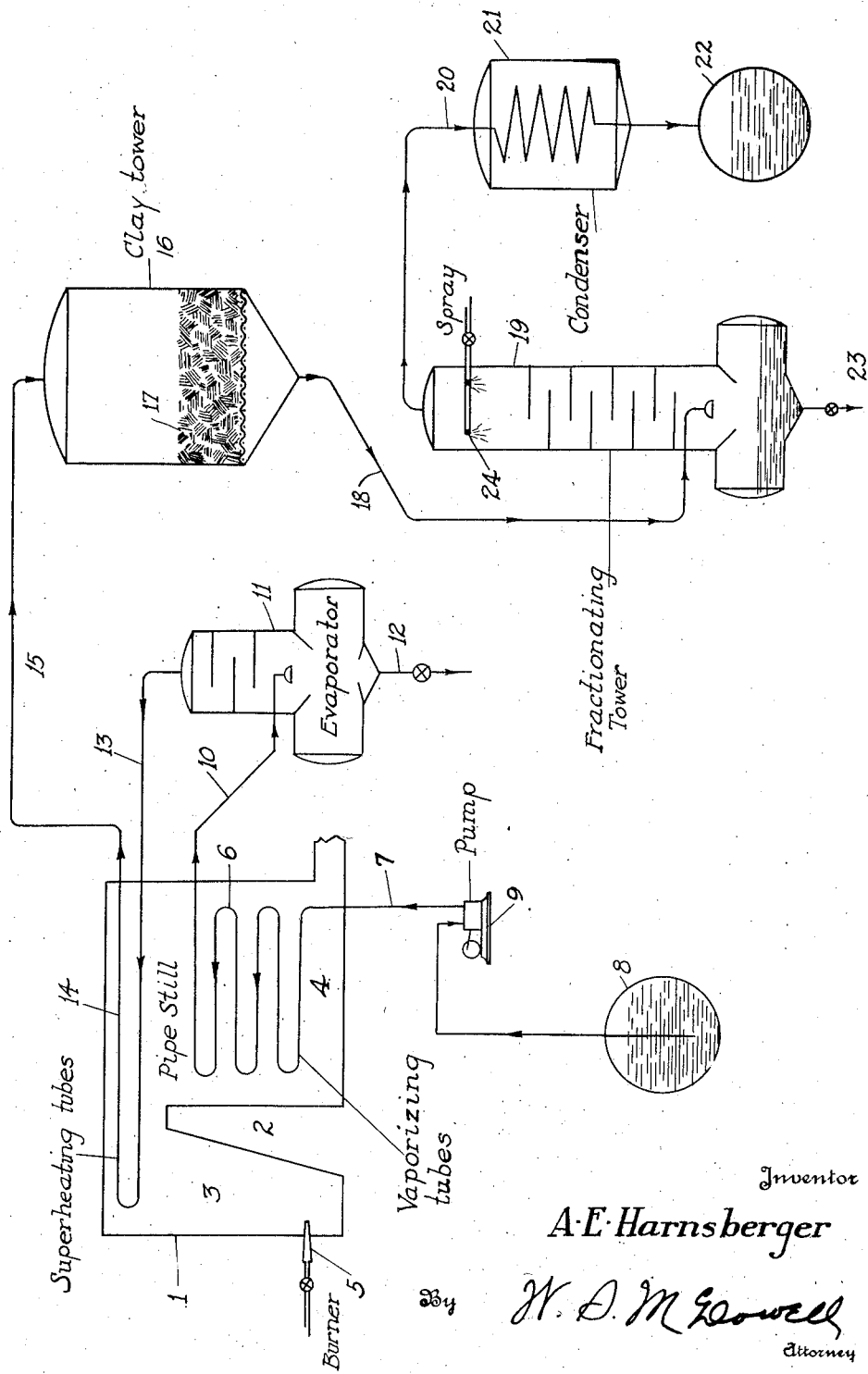

1,887,018

UNITED STATES PATENT OFFICE

AUDLEY E. HARNSBERGER, OF CHICAGO, ILLINOIS, ASSIGNOR TO THE PURE OIL COMPANY, OF CHICAGO, ILLINOIS, A CORPORATION OF OHIO

PROCESS OF TREATING HYDROCARBON OILS

Application filed September 30, 1929. Serial No. 396,066.

This invention relates to the art of treating hydrocarbon oils for the purpose of removing from such oils certain undesirable compounds which interfere with the utility of said distillates when the latter are placed to certain uses. In its more specific aspects, the present invention has reference to the treatment of cracked petroleum distillates, particularly those distillates obtained by high temperature of vapor phase methods of cracking and which possess relatively large proportions of unsaturated compounds. It is well known that a portion of such unsaturated compounds tend through polymerization to produce gums or resinous bodies, especially when the distillates are subjected to transportation and handling in the presence of light and air.

It is therefore an outstanding object of the present invention to pass cracked petroleum distillates which have approximately the boiling range of gasoline and which contain undesirable unsaturated compounds in a highly or super heated form into contact with a solid catalyst or adsorbent for the purpose of effecting polymerization reactions in the distillate under treatment, whereby to accelerate the formation of the gums so that the latter may be removed at the time of treatment from the distillate and said distillate separately collected in a purified condition ready for commercial usage.

The outstanding feature of the present invention resides in vaporizing and super-heating the vapors of the distillate to be treated. Heretofore it has been customary to heat the distillate to a vaporizing temperature and then at such temperature to pass the vapors through the bed of fuller's earth or other adsorbent used in promoting the polymerization reactions. In contrast to this original method, the present invention resides in not only vaporizing the distillate adapted for treatment but in additionally heating the same to a temperature above that at which vaporization takes place in order that said vapors will be in a highly reactive form when brought into contact with the catalyst or adsorbent. The passing of saturated low temperature gasoline vapors through a bed of fuller's earth necessarily means a low vapor temperature and consequently slow reaction. However, by first vaporizing the gasoline or other petroleum distillate under treatment and then super heating it, before its passage through the clay bed, the speed and effectiveness of the polymerization reactions are increased, the effective life of the catalyst prolonged and a purified distillate of improved color and free from gum deposits is obtained.

For a further understanding of the invention, reference is to be had to the following description and the accompanying drawing, wherein has been illustrated diagrammatically apparatus or a flow diagram which may be used in carrying the present invention into practical operation. It will be understood, however, that this flow diagram sets forth but one of several practical adaptations of the present invention and has been selected merely as a vehicle for facilitating a description and understanding of the invention and is not to be considered in a limiting sense.

In said drawing, the numeral 1 designates the setting of an ordinary pipe still employed in oil refining practices. The setting is provided with the usual internal bridge wall 2 which divides the setting into combustion and tube chambers 3 and 4 respectively. A burner or other form of heater 5 is disposed in the combustion chamber to develop necessary furnace temperatures to carry on the distillation operations hereinafter described. Disposed within the chamber 4 is a heating coil 6 to which is connected at one end an oil inlet line 7. A cracked petroleum distillate, which may have substantially the boiling range of gasoline or may contain higher boiling compounds is forced through the line 7 and the coil 6 from a tank 8, and a pump 9 may be employed for this purpose. During this passage through the coil 6 the oil is substantially vaporized and may be raised, for example, to a temperature of 325° F. The outlet line 10 of the coil leads the substantially vaporized oil into an evaporator 11, wherein expansion of the vaporized oil is permitted for the purpose of effecting a mechanical separation of the high boiling liquid fractions from the lower boiling vaporized fractions. The high boiling liquid fractions may be withdrawn from the bottom of the evaporator by way of the valved outlet line 12, whereas the desired vaporized fractions pass overhead from the evaporator through a line 13 and are conducted to a second heating coil 14 arranged in or near the roof of the setting 1. In other words, the coil 14 is disposed in the zone of highest temperature within the setting in order that the vapors released from the top of the evaporator may be additionally heated. This operation I terminate for convenience in description "super-heating", and by that expression I mean the heating of the vapors to a temperature above that at which under ordinary pressures they normally vaporize. For example, the vapors entering the coil 14 may possess a temperature of approximately 325° F., and when discharged from said coil will possess a temperature of approximately 375° F. or higher, the vapors having been super-heated by the coil 14 to raise the temperature thereof 50° or more.

These super-heated oil vapors then pass through a line 15 to a clay tower 16, of the type commonly employed in oil refining practices. These towers usually comprise a closed cylindrical steel shell in which is positioned a bed 17 of an adsorbent or catalytic material such as fuller's earth or other diatomaceous materials. It has been recognized that the passage of petroleum vapors containing unsaturated compounds through fuller's earth results in promoting polymerization reactions whereby the undesirable gum forming compounds are formed so that they may be readily collected and removed from the distillate undergoing treatment. Heretofore it has been customary to pass vapors at relatively low temperatures through the bed of fuller's earth. This has been done for the reason of permitting partial condensation of the vapors during their passage through the fuller's earth, it having been considered that the condensed fractions of the oil under treatment serve as a solvent for the purpose of continually flushing or removing the heavy tarry polymers from the fuller's earth thereby to keep the earth in a fresh state of activity for a greater period of time. I have found, however, that these low vapor temperatures produce a correspondingly slow reaction. However, by super-heating the oil vapors, that is, an appreciable heating of the vapors above their normal vaporizing temperatures, the speed of the reactions are greatly increased and this is accomplished, I have found, without any noticeable decrease in the life of the catalyst. The present invention distinguishes from earlier processes also in the respect that all of the hydrocarbons entering the clay tower are in a super-heated condition. This feature is assured by reason of the fractionation which takes place ahead of the clay tower and also by the employment of necessary temperatures to vaporize and super-heat the highest boiling compounds present in the vapors passing through the clay tower.

The vapors may be heated to a temperature of 550° F. and maintained under a pressure of approximately 10 pounds per square inch when introduced into the clay tower. Under these conditions the heaviest hydrocarbons in the vapors are super-heated to a temperature approximately 250° F. in excess of ordinary treating temperatures. Following passage of the vapors through the filtering bed 17 the oils are removed from the tower by way of the outlet line 18 and are introduced into the bottom of the fractionating tower 19. In this tower there takes place the desired separation of the liquid polymer-containing fractions from the vaporous polymer-free fractions. The latter pass upwardly through the fractionating tower and thence through an overhead line 20 to a cooler or condenser 21, where the temperature of the vapors is reduced to liquefy or condense the polymer-free product and to permit of the collection of the latter as commercially usable motor fuel in a receiving tank 22. This finished stock collected in the tank 22 is invariably of good color (better than 28 Saybolt) and is substantially gum free. The polymer-containing fraction may be removed from the bottom of the fractionating tower by way of the valved outlet line 23. If desired, a spray coil 24 may be employed in the top of the fractionating tower to control more effectively the removal of high boiling point compounds from the vapors which sweep through the tortuous passageways of the fractionating tower.

It is also possible and sometimes desirable to admit the vapors under superatmospheric pressure to be heated in the coil 6, the vapors passing through line 10 into a separation zone 11 where the pressure on said vapors is released. The separation of the higher boiling fractions takes place in this separation zone, the lower boiling point vapors passing through line 13 into the heating zone 1 and passing through line 14 where they are super-heated, thence through line 15 into clay tower 16 where they are treated with polymerizing adsorbent catalyst; passing through line 18 into fractionating tower 19 where the separation of the polymer containing fraction from the polymer free fraction takes place, the polymer free vapors passing through line 20 to condenser 21 where the said vapors are condensed and passed to a storage tank 22. The polymer containing fraction is withdrawn from tower 19 by means of line 23.

What is claimed is:

1. The method of removing gum-forming and color-imparting bodies from vapor phase cracked unsaturated low boiling hydrocarbon oils, which consists in the steps of vaporizing a moving stream of such oils by subjecting such oils to relatively low vaporizing temperatures without causing cracking, then passing the oils and vapors into a separating zone to remove unvaporized higher boiling oils from the desired vapors, removing the vapors from the separating zone and subjecting the same to higher vaporizing temperatures than those prevailing in said first mentioned vaporizing zone, whereby to superheat said vapors, then bringing the superheated vapors, while at an elevated temperature into contact with a polymerizing adsorbent, and fractionating the vapors following contact with said adsorbent under reduced pressures to remove from the treated vapors oils of high boiling point and undesirable polymerized compounds.

2. In the refining of unsaturated cracked petroleum oils containing gum forming bodies, the steps which consist in passing such oils through an initial vaporizing zone wherein the temperature of said oils is raised sufficiently to vaporize the major portion of such oils without causing any further appreciable cracking, passing the oils and vapors from said zone through a separating zone to remove the unvaporized oils, then passing the vapors released from said separating zone through a superheating zone wherein the vapors attain a temperature from 50° F. to 250° F. in excess of the temperature of the vapors discharged from said vaporizing zone, then passing the superheated vapors from the superheating zone and without substantial decrease in the temperature thereof, into contact with a polymerizing adsorbent of the nature of fuller's earth, and fractionating vapors following contact with adsorbent to remove therefrom undesirable high boiling oils and polymerized compounds.

3. The method of removing gum-forming and color-imparting bodies from cracked low boiling petroleum oils containing high percentages of unsaturated compounds comprising: subjecting such an untreated oil to heat treatment in a vaporizing zone to effect the vaporization of the low boiling constituents of the oil without causing any further appreciable cracking, removing from the oil in an unheated separating zone the higher boiling oils which do not vaporize under the temperatures applied to the oils in the vaporizing zone, passing the vapors from the separating zone through a superheating zone wherein said vapors attain without any substantial cracking thereof a higher temperature than those obtained in the vaporizing zone, bringing the vapors discharged from the superheating zone into contact with a polymerizing catalyst of the nature of fuller's earth in a catalyzer-zone and then fractionating the products discharged from the catalyzer-zone to separate the desired low boiling vapors from the undesired high boiling polymer-containing liquid oils.

4. The method of removing gum-forming and color-imparting bodies from cracked low boiling petroleum oils containing high percentages of unsaturated compounds comprising: subjecting such an untreated oil to heat treatment in a vaporizing zone to effect the vaporization of the low boiling constituents of the oil without causing any further appreciable cracking, removing from the oil in an unheated separating zone the higher boiling oils which do not vaporize under the temperatures applied to the oils in the vaporizing zone, passing the vapors from the separating zone through a superheating zone wherein said vapors attain without any substantial cracking thereof a higher temperature than those obtained in the vaporizing zone, bringing the vapors discharged from the superheating zone into contact with a polymerizing catalyst of the nature of fuller's earth in a catalyzer-zone, then fractionating the products discharged from the catalyzer-zone to separate the desired low boiling vapors from the undesired high boiling polymer-containing liquid oils, and heating the superheating zone by the passage of furnace gases therethrough to a high temperature and using the heat remaining in the furnace gases following passage through the superheating zone to heat the vaporizing zone to a lower temperature.

In testimony whereof I affix my signature.

AUDLEY E. HARNSBERGER.